(12) United States Patent
McArdle et al.

(10) Patent No.: US 9,177,422 B2
(45) Date of Patent: Nov. 3, 2015

(54) METHOD FOR GENERATING REGULAR ELEMENTS IN A COMPUTER-AIDED DESIGN DRAWING

(75) Inventors: Paul Joseph McArdle, Bow, NH (US); Lang Sheng Yun, Bedford, NH (US)

(73) Assignee: AUTODESK, INC., San Rafael, CA (US)

( * ) Notice: Subject to any disclaimer, the term of this patent is extended or adjusted under 35 U.S.C. 154(b) by 1645 days.

(21) Appl. No.: 11/471,058

(22) Filed: Jun. 19, 2006

(65) Prior Publication Data

US 2007/0291036 A1   Dec. 20, 2007

(51) Int. Cl.
*G06F 17/50* (2006.01)
*G06T 19/00* (2011.01)

(52) U.S. Cl.
CPC .............. *G06T 19/00* (2013.01); *G06F 17/50* (2013.01); *G06F 2217/06* (2013.01); *G06T 2200/24* (2013.01); *G06T 2219/012* (2013.01); *G06T 2219/2004* (2013.01); *Y10S 706/919* (2013.01); *Y10S 715/964* (2013.01)

(58) Field of Classification Search
CPC .............. G06F 17/50; G06F 2217/06; G06T 2219/012; G06T 2219/2004; Y10S 715/964; Y10S 706/919

USPC .......................................................... 715/764
See application file for complete search history.

(56) References Cited

PUBLICATIONS

Mark Walker, "Microsoft Office Visio 2003 Inside Out," Oct. 29, 2003, Microsoft Press.*
David Harrington, et al. "Inside AutoCAD 2002," 2002, Que.*
"Drawings to Accompany the Building Guidelines," http://www.oas.org/CDMP/document/codedraw/intro.htm, by the Caribbean Disaster Mitigation Project.*

* cited by examiner

*Primary Examiner* — Ajay Bhatia
*Assistant Examiner* — Daniel Um
(74) *Attorney, Agent, or Firm* — Artegis Law Group, LLP

(57) ABSTRACT

The process of generating regular elements in a CAD drawing is accelerated by providing a CAD designer with graphical user interface (GUI) tools to generate regular elements for a CAD drawing interactively, dynamically, and in real-time. The GUI tools allow the CAD designer to preview the regular elements that he or she will be adding to the CAD drawing and modify the number of regular elements to be added interactively and in real-time.

21 Claims, 14 Drawing Sheets

METHOD FOR GENERATING REGULAR ELEMENTS IN A COMPUTER-AIDED DESIGN DRAWING

BACKGROUND OF THE INVENTION

1. Field of the Invention

The present invention generally relates to computer-aided design and, more particularly, to a method for generating regular elements in a computer-aided design drawing.

2. Description of the Related Art

The term computer-aided design (CAD) generally refers to a broad variety of computer-based tools used by architects, engineers, and other construction and design professionals. CAD applications may be used to construct computer models representing virtually any real-world construct. For example, CAD applications are frequently used to compose graphical representations of civil engineering constructs such as beams, walls and columns. Using a CAD application, a user may compose a CAD drawing by selecting drawing elements and positioning them within the drawing. Typically, drawing elements are provided to represent elements of the object being modeled.

In composing a drawing for a building, there are often sets of elements that are laid-out in regular fashion. This is particularly true of structural members. For example, columns often conform to a regular grid and beams typically connect columns at each floor. In a similar manner, floor and roof joists span floor beams and roof girders at regular intervals.

The process of creating these elements is time-consuming and often tedious. In the example of structural members, a discrete drawing process must be undertaken for each structural member drawn. For each structural member to be drawn, a start point and an end point must be identified first, and then the structural member will be drawn between the start and end points. In other words, the structural members must be drawn one at a time.

A software product provided by VisionREZ partially automates the process of drawing regular elements. With this software, the user selects a bay and then enters into a dialog mode. While in this mode, the user makes numerical inputs into an input window, e.g., to specify the number of beams or floor joists to add to the bay, and the spacing between them. When the user submits these inputs for processing, the regular elements are generated in accordance with the inputs and saved into the drawing. For any modifications, the user will need to re-enter the dialog mode and edit the prior inputs.

SUMMARY OF THE INVENTION

The present invention accelerates the process of generating regular elements in a CAD drawing by providing a CAD designer with the ability to generate regular elements for a CAD drawing interactively, dynamically, and in real-time. With the present invention, the CAD designer can preview the regular elements that he or she will be adding to the CAD drawing, and can modify the number of regular elements to be added interactively and in real-time. Embodiments of the present invention provide a method for generating regular elements for a CAD drawing, and a computer program product containing instructions for a computer system to carry out such a method.

One feature of the present invention is that a preview display of the regular elements to be added is generated automatically and in real-time (e.g., when a user selects a drawing element and positions an input device pointer on top of a layout object). With this feature, the user can preview additions of regular elements to a CAD drawing before accepting them. Another feature of the present invention is that the preview display is modified automatically and in real-time in response to user inputs (e.g., pressing the CTRL key changes the number and arrangement of regular elements to be added).

The method according to one embodiment of the present invention includes the steps of displaying a user interface including an input section and a layout object, receiving a selection of a structural member from the input section, monitoring a position of an input device pointer on the user interface, and generating a display of one or more structural members to be added when the input device pointer is positioned on top of the layout object.

The method according to another embodiment of the present invention includes the steps of selecting a structural member from an input section of a user interface, and positioning an input device pointer on top of a layout object displayed on the user interface to cause the layout object to be highlighted and preview graphics of one or more structural members to be displayed.

DETAILED DESCRIPTION

The present invention provides graphical user interface (GUI) tools to generate regular elements for a CAD drawing interactively, dynamically and in real-time. With these tools, the CAD designer can actually see the regular elements as he or she is creating them or modifying them. The position of the regular elements is determined by the position of an input device pointer controlled by the CAD designer. The number of regular elements that are created is also controlled by the CAD designer. As one example, the CAD designer presses the CTRL key on the keyboard to modify the number and arrangement of regular elements that are created.

Figure 1:
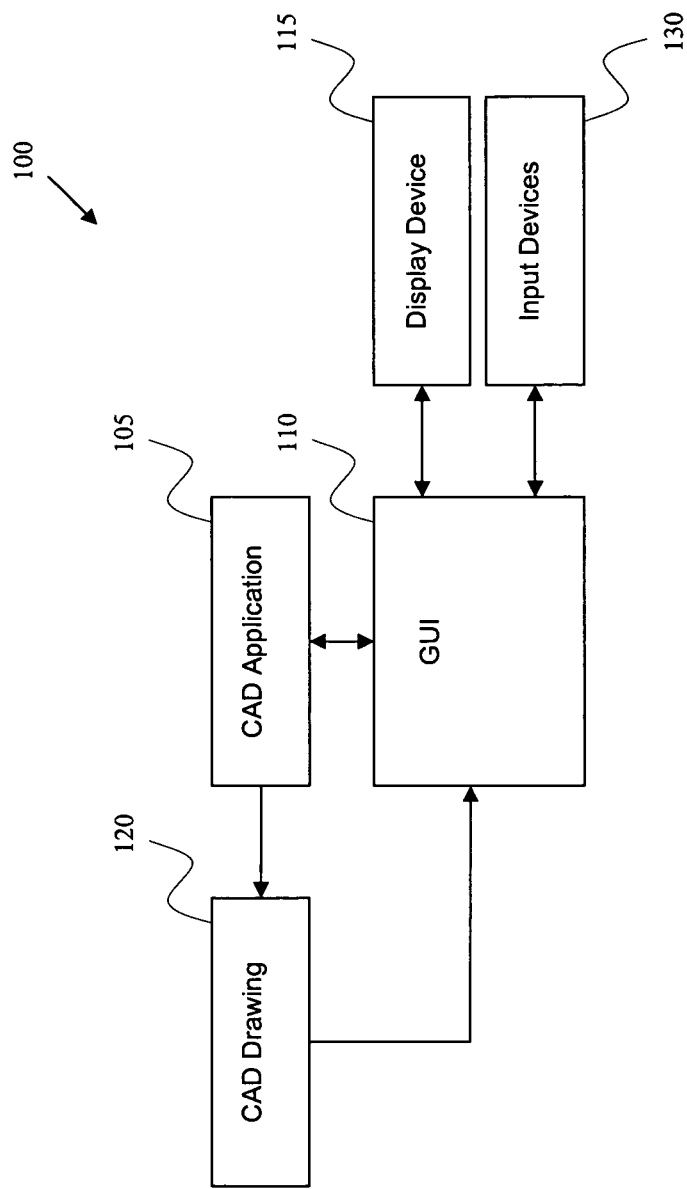
FIG. 1 is a conceptual block diagram of a computer system with which embodiments of the present invention can be practiced.

FIG. 1 is a conceptual block diagram of a computer system 100 with which embodiments of the present invention can be practiced. The components of the computer system 100 illustrated in FIG. 1 include CAD application 105, graphical user interface (GUI) 110, CAD drawing 120, user input devices 130, and a display device 115. CAD application 105 is a software application that is stored in memory and executed by the processor of the computer system 100. It includes software program routines or instructions that allow a user interacting with GUI 110 to create, view, modify and save CAD drawing 120. In the examples provided herein, the CAD application 105 is the Autodesk® Architectural Desktop software application program and associated utilities. Typically, user input devices 130 include a mouse and a keyboard, and display device 115 includes a CRT monitor or LCD display.

Figure 2A:
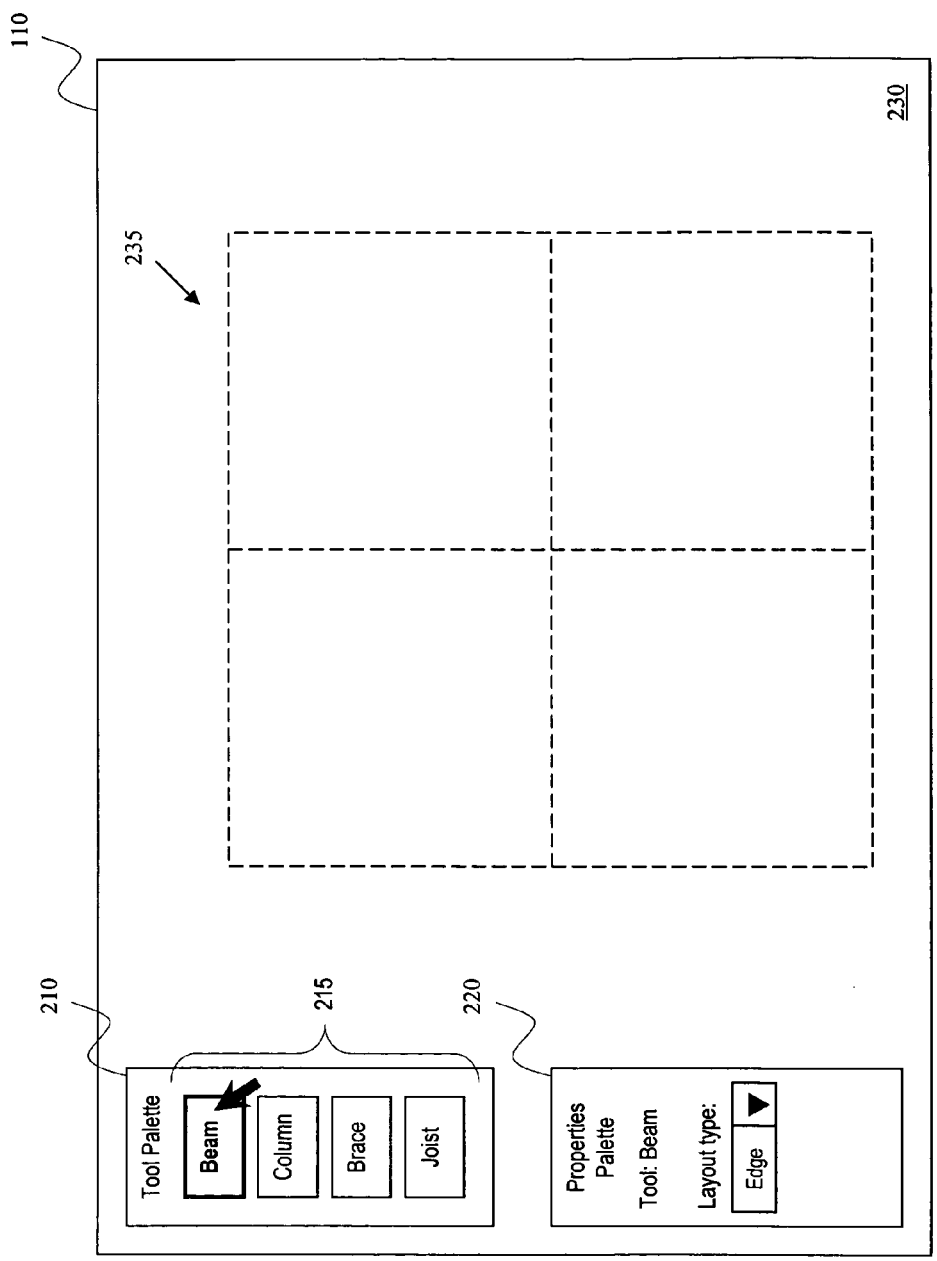
FIGS. 2A-2E are schematic representations of graphical user interfaces that illustrate a method according to an embodiment of the present invention.

FIG. 2A is a schematic representation of a sample GUI 110 that may be used to generate regular elements in accordance with the embodiments of the present invention. As shown, GUI interface 110 includes a tool palette 210, various selectable items 215 within the tool palette 210, a properties palette 220, and a layout section 230. The layout section 230 represents the area of CAD drawing 120 in which regular elements will be generated and includes a layout object with respect to which the regular elements will be generated. The layout object shown in FIG. 2A is a column grid 235.

As used herein, the term "regular elements" means a drawing element that is to be laid out multiple times in a regular manner on a CAD drawing. A particular drawing element that the user desires to lay out multiple times in a regular manner on a CAD drawing is selected from the tool palette 210. Within CAD application 105, each drawing element in the tool palette 210 corresponds to an object that models a structural member of a particular type and style. Different types of structural members include beams, columns, braces, etc. Also, a single type of structural member may have different styles. Generally, different styles of the same structural member have different cross-sections. In some instances, structural members of different types may share the same style. When a structural member of a particular type and style is selected from the tool palette 210 and is laid out with respect to a CAD drawing 120, CAD application 105 creates an instance of the object corresponding to the structural member. An instance of an object corresponding to a structural member defines the length, rotation, and position of that structural member.

The tool palette 210 shown in FIG. 2A is a schematic representation of the actual tool palette. The actual tool palette typically displays icons representing different types and styles of structural members. For simplicity in illustration, the selections shown in tool palette 210 include just four: Beam, Column, Brace, and Joist. These four correspond to a beam of a particular style, a column of a particular style, a brace of particular style, and a joist of a particular style, respectively. In the example provided in FIG. 2A, the drawing element, Beam (shown highlighted), is selected from the tool palette 210. The arrow represents a cursor of an input device, e.g., a mouse cursor.

In response to a selection of a drawing element from the tool palette 210, the properties palette 220 is updated to display the default properties and input fields associated with the selected drawing element. In addition, CAD application 105 initiates a process to monitor the mouse cursor position. If CAD application 105 determines that the mouse cursor position is positioned on top of a supported object (i.e., an object that can support the generation of the selected drawing element according to a regular layout), it highlights the display of that object to indicate to the user that the drawing element selected from the tool palette 210 can be laid out in a regular manner with respect to that object and generates a preview graphic of the drawing elements to be laid out in a regular manner.

In the example of FIG. 2A, the drawing element selected from the tool palette 210 is Beam, which corresponds to a beam structural member of a particular style. One of the supported objects for beams is a column grid. There are other supported objects including a slab or a closed polyline. For a column structural member, supported objects include a column grid or a wall. A supported object for a structural member may even be as simple as two lines drawn on the CAD drawing 120, and multiple instances of the selected drawing element may be laid out in a regular manner between the two lines.

One of the input selections associated with a beam and displayed in the properties palette 220 is "Layout type." The layout type may be "Edge" or "Fill." The "Edge" option is for laying out beams along the edges of a column grid or along the edges of a slab or closed polyline. The "Fill" option is for laying out beams in one or more cells of a column grid or within a closed space defined by a slab or a closed polyline. When the "Fill" option is selected, two additional input fields are displayed. The first input field is for specifying either a "Repeat" layout or a "Space evenly" layout. If the "Repeat" layout option is specified, the second input field is for specifying the spacing between two structural members. If the "Space evenly" layout is specified, the second input field is for specifying the number of bays that are to be created within the fill area when the structural members are generated.

Figure 2B:
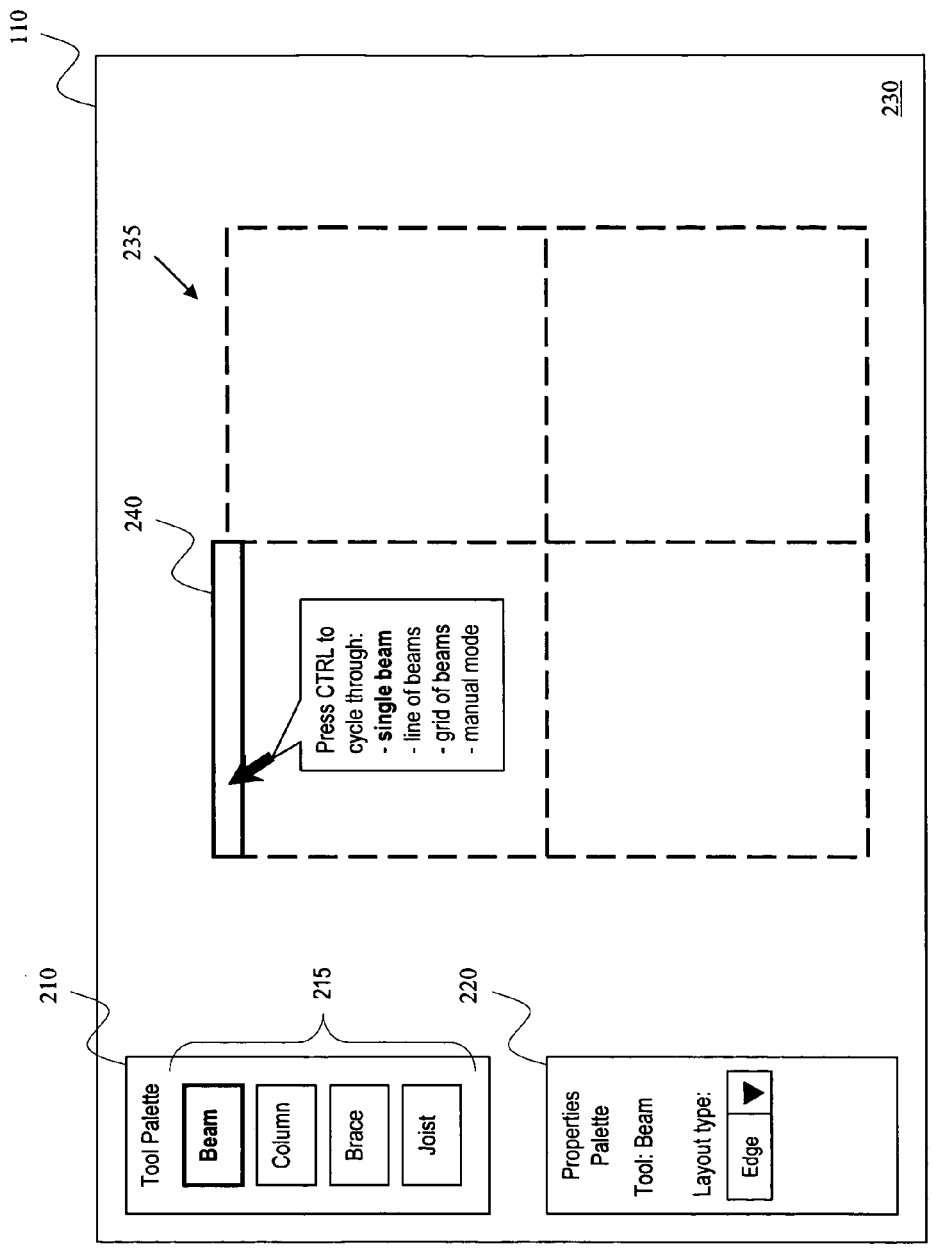

FIGS. 2B-2E provide schematic representations of the changes in the GUI 110 as the user makes inputs through the GUI 110 to lay out multiple beams in a regular manner on the edges of the column grid 235. In FIG. 2B, the user positions the mouse cursor on top of an edge of the column grid 235. In response, the display of the column grid 235 highlights, and a preview graphic of a beam 240 is displayed at the position of the mouse cursor. FIG. 2B also shows a tool tips display that also appears. The tool tips display informs the user of additional options that can be selected using the CTRL key. The highlighted option is the current option which is a single beam generated at the position of the mouse cursor. The second option, activated by pressing the CTRL key once, is a line of beams generated at the position of the mouse cursor. The third option, activated by pressing the CTRL key one more time, is a grid of beams generated throughout the column grid 235. The fourth option is a manual mode, activated by pressing the CTRL key one more time. This mode allows the user to exit out of the mode for automatically generating regular elements. Pressing the CTRL key one more time cycles the user back to the "single beam" mode.

Figure 2C:
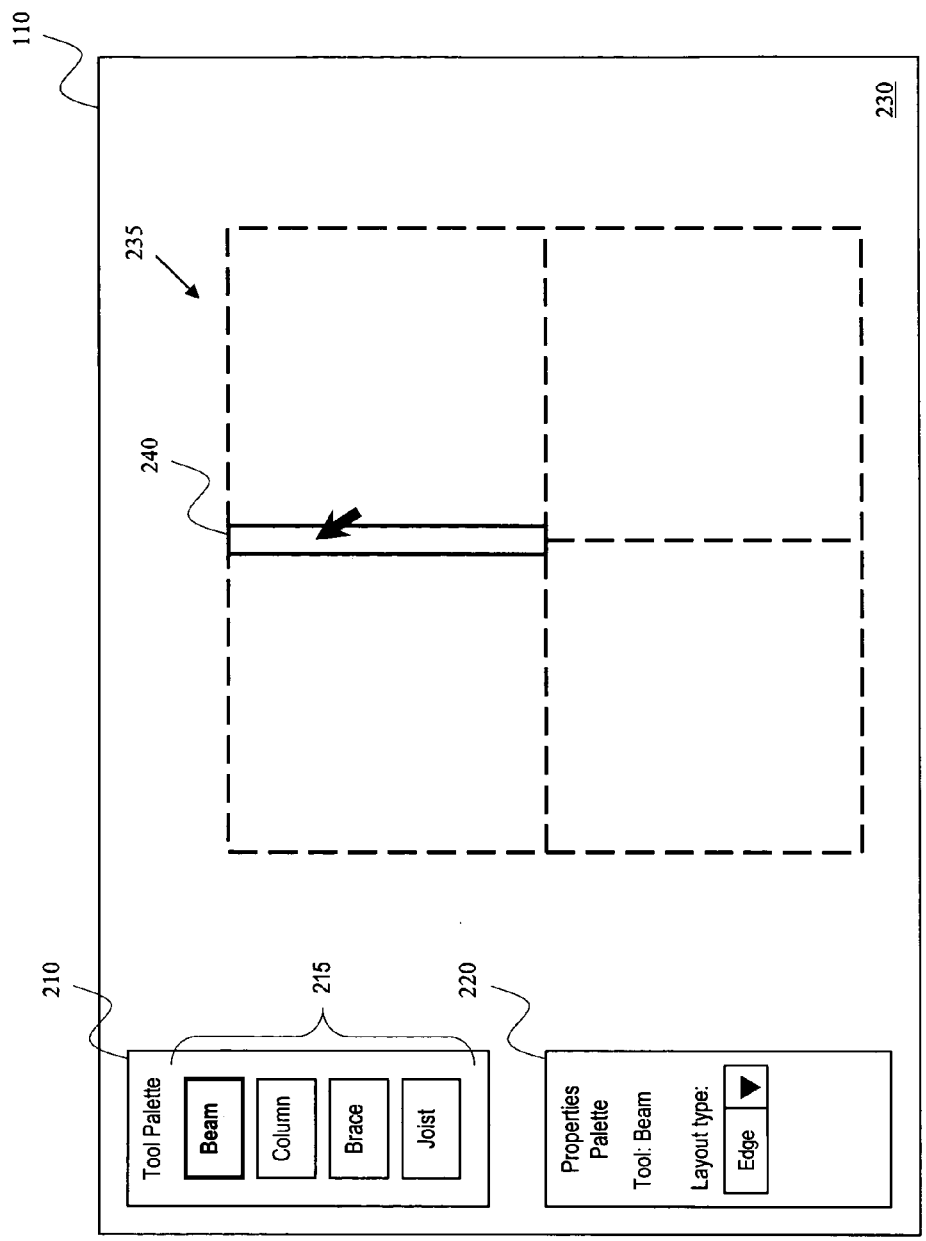
Figure 2D:
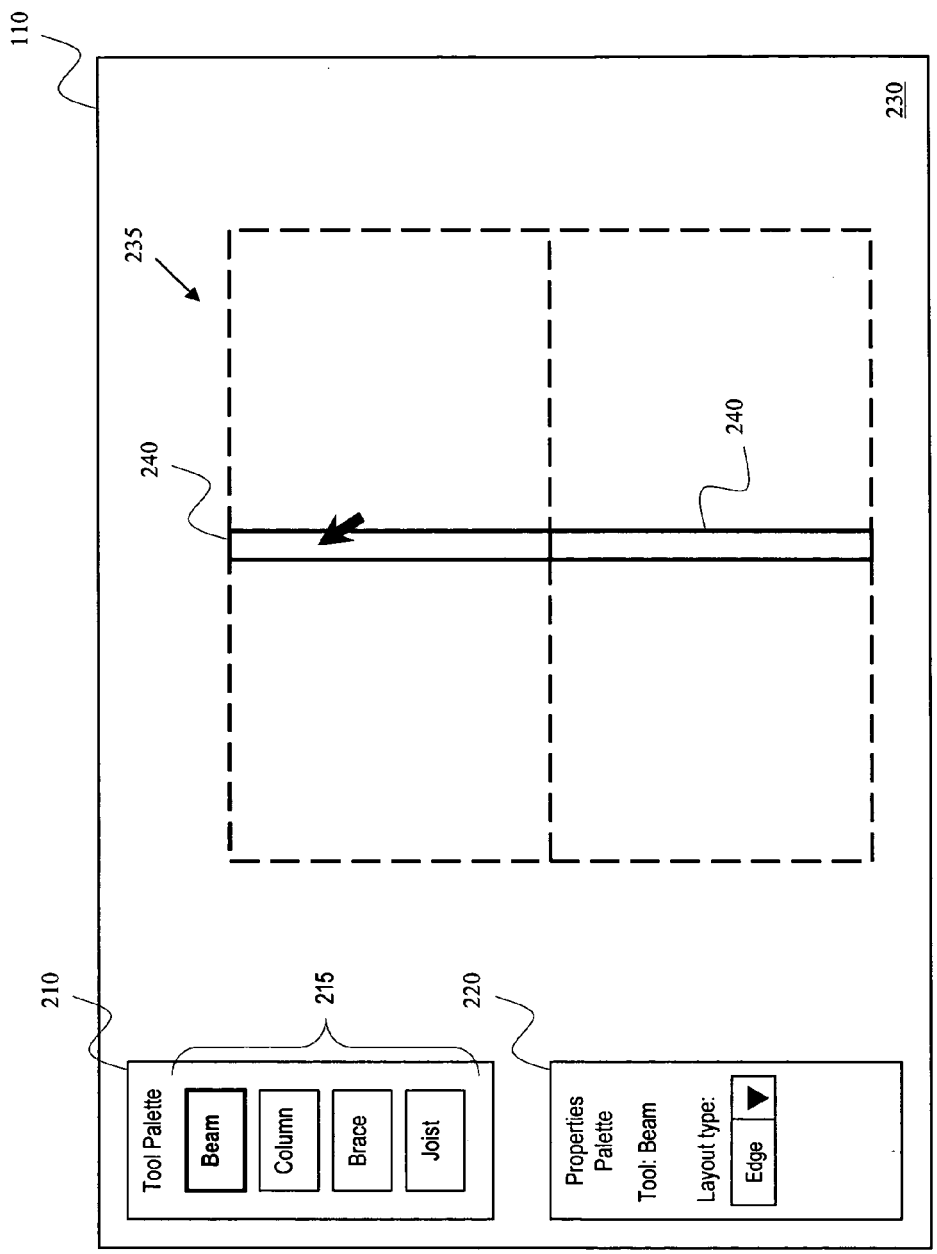
Figure 2E:
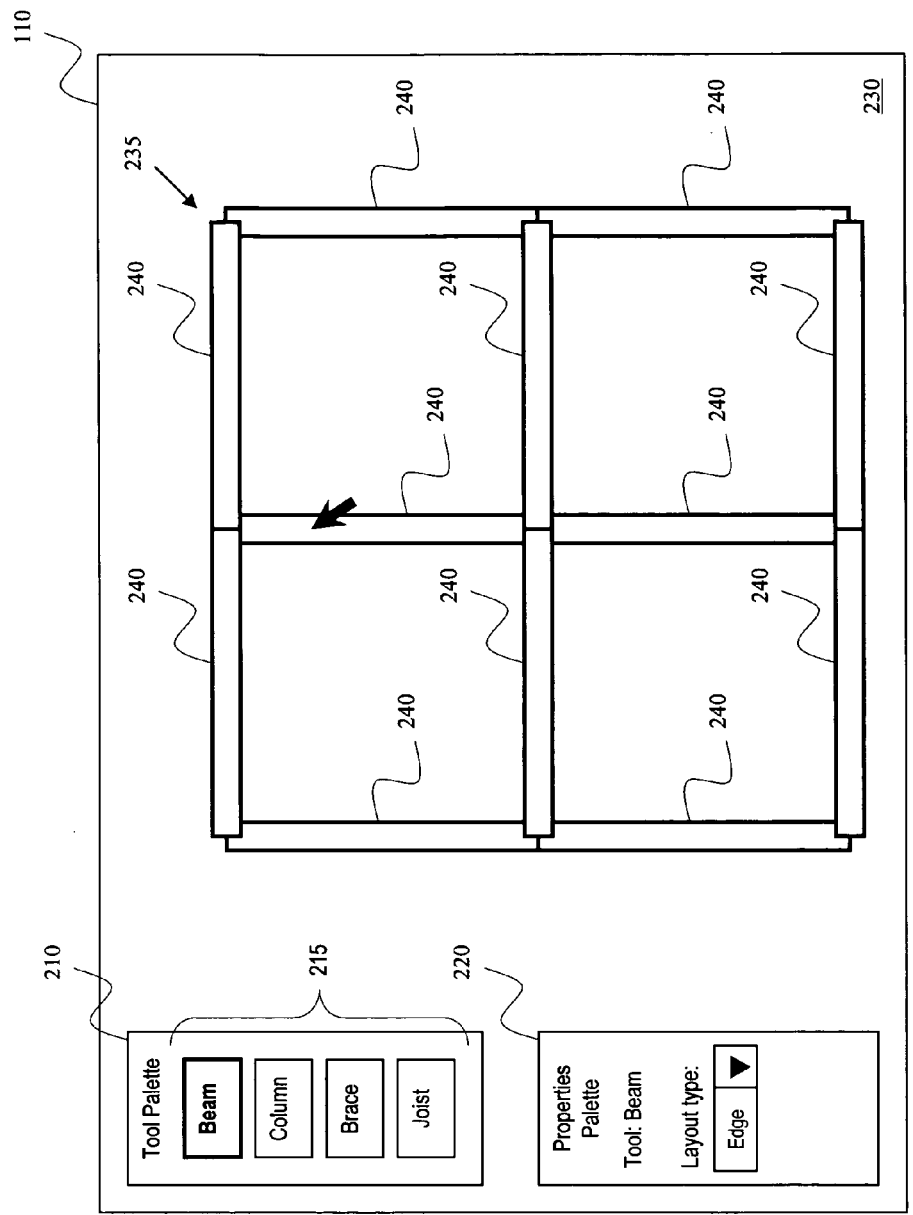

FIG. 2C illustrates the changes to the GUI 110 when the user moves the mouse cursor to a different position on the column grid 235. Here, the position and orientation of the preview graphic of the beam has changed in accordance with the change in the mouse cursor position. FIG. 2D illustrates the changes to the GUI 110 when the user presses the CTRL key once after generating the single beam shown in FIG. 2C. Here, the preview graphic of multiple beams along one line of the column grid 235 is generated. FIG. 2E illustrates the changes to the GUI 110 when the user presses the CTRL key one more time after generating the line of beams shown in FIG. 2E. Here, the preview graphic of multiple beams along all edges of the column grid 235 is generated. In the preferred embodiment, a preview graphic of a structural member has less detail than the regular graphic of the structural member. This saves system resources. However, in alternative embodiments, the preview graphic of a structural member may have as much detail as the regular graphic of the structural member.

Figure 3A:
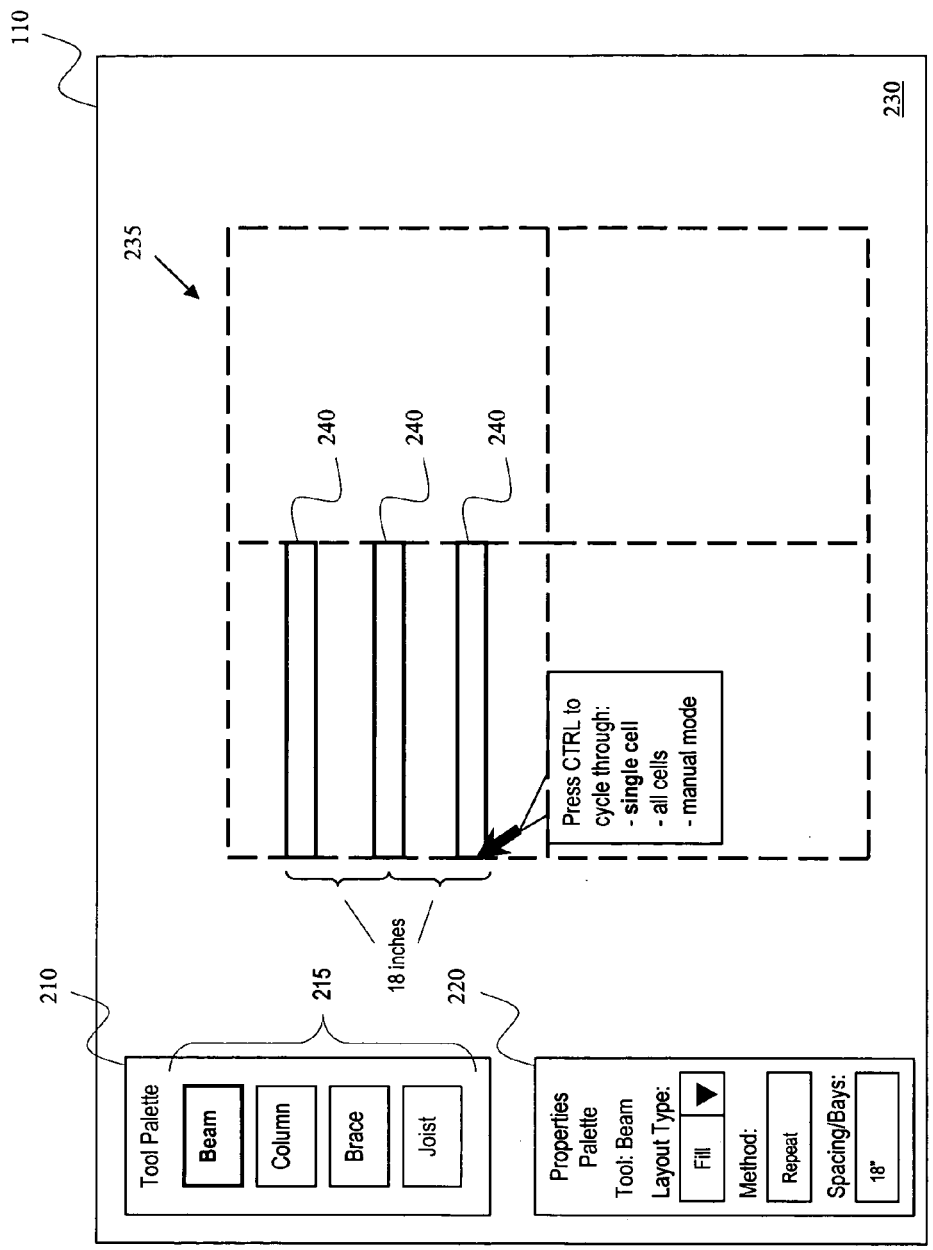
FIGS. 3A-3C are schematic representations of graphical user interfaces that illustrate a method according to another embodiment of the present invention.
Figure 3B:
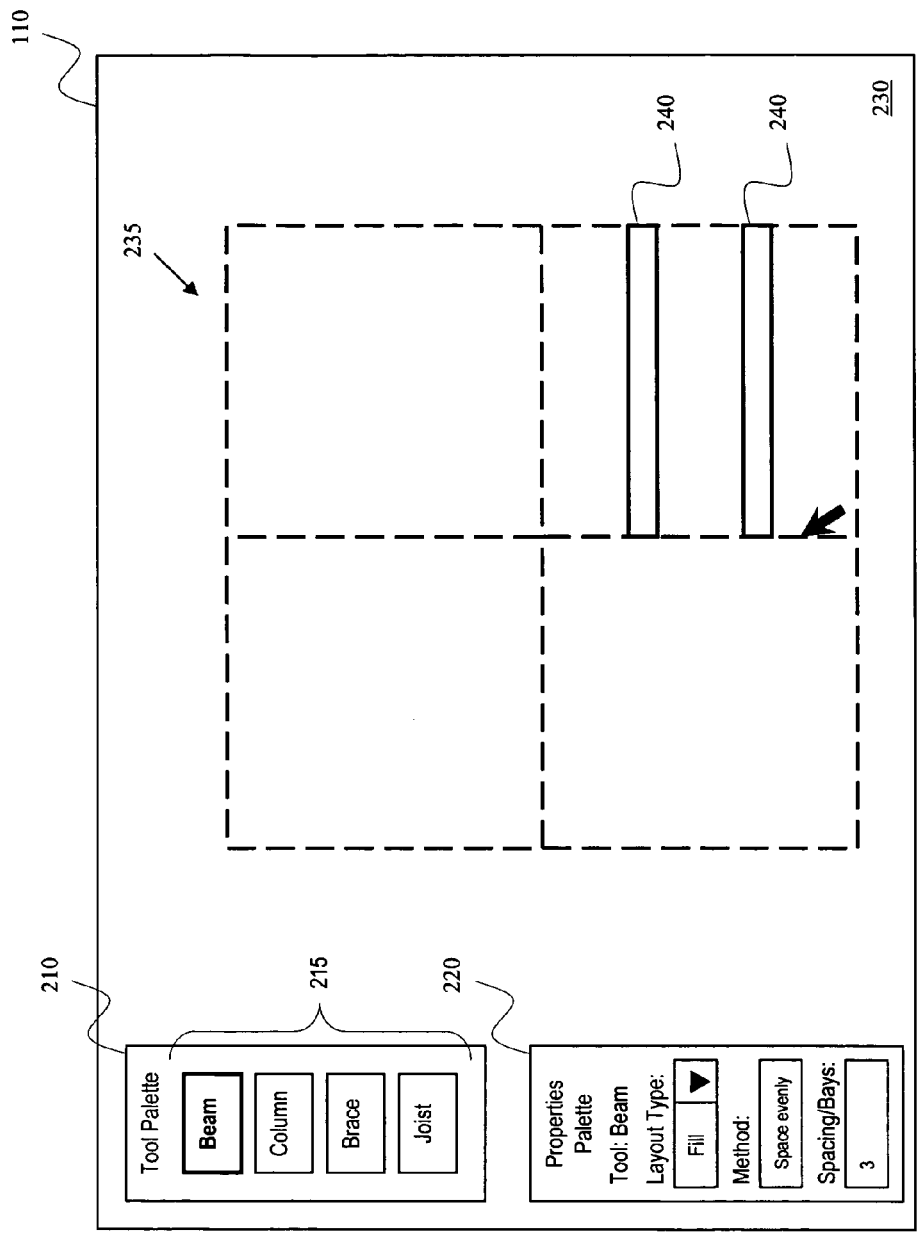
Figure 3C:
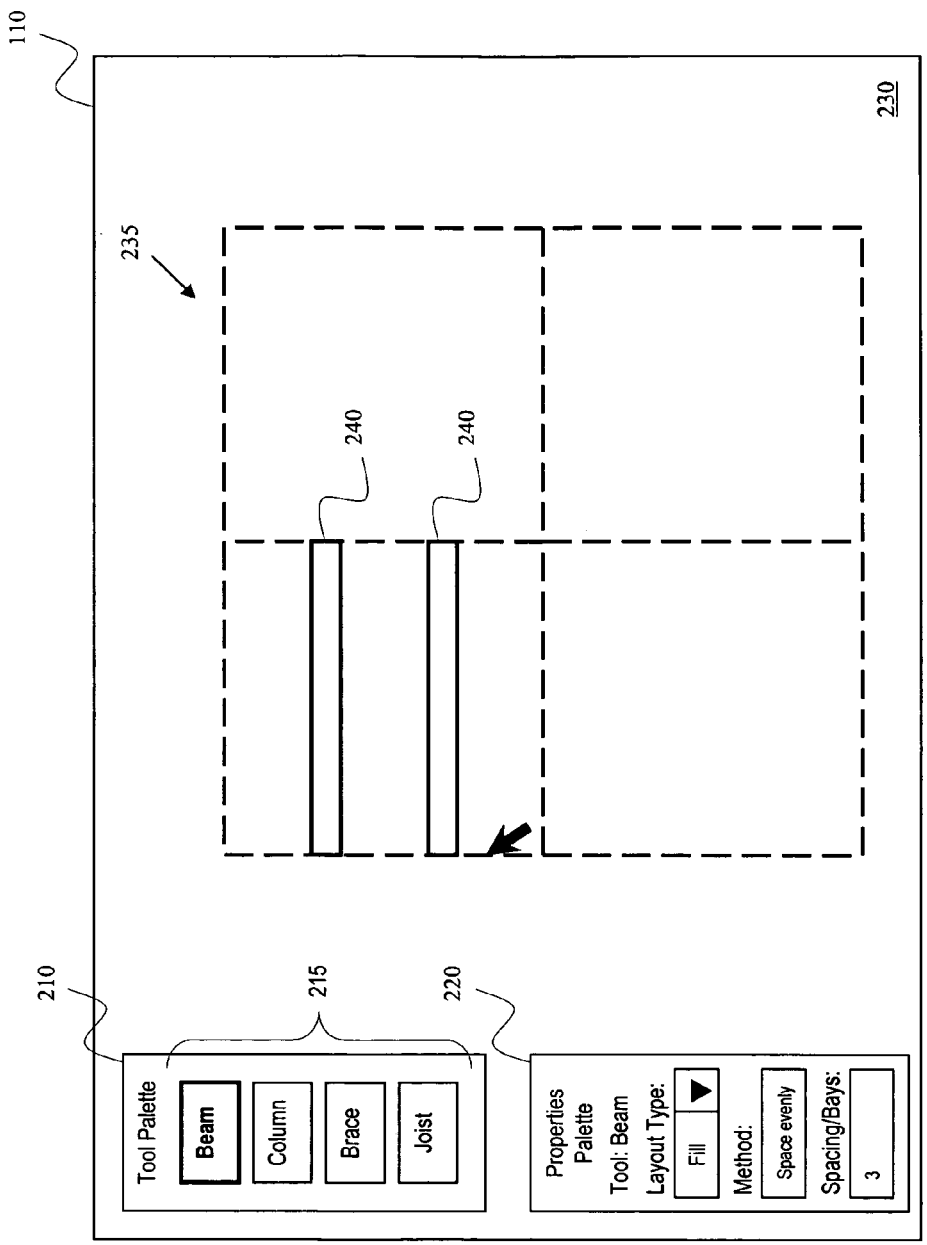

FIGS. 3A-3C provide schematic representations of the changes in the GUI 110 as the user makes inputs through the GUI 110 to lay out multiple beams in a regular manner in the "fill" area defined by the cells of the column grid 235. The tool palette 210 shows the drawing element, Beam, highlighted to indicate the drawing element that has been selected, and the properties palette 220 shows that the "Layout Type" selected is "Fill." When a user positions the mouse cursor over an edge of the column grid 235, the column grid 235 becomes highlighted, and a preview display of the multiple beams is generated in that fill area. The display of the multiple beams is generated so that the beams are aligned perpendicular to the edge of the column grid 235 over which the mouse cursor is positioned. The user has the option of "filling" a single cell or all cells of the column grid 235 by operation of the CTRL key.

In the example shown in FIG. 3A, the layout method is specified as "Repeat" and the spacing between the beams is specified as 18 inches. The first beam is positioned at the location of the mouse cursor and the other beams that are needed to fill the cell are laid out with respect thereto. It is possible to specify the rotation of the beams using an input field for the rotation angle (not shown), which is also provided in the properties palette 220. If the rotation angle is specified as 90 degrees, the beams 240 shown in FIG. 3A will have a vertical orientation.

FIG. 3B provides an example of "filling" a cell of the column grid 235 using the "Space evenly" layout method, where the number of bays parameter has been specified as 3. This means that 2 beams will need to be generated in the fill area so that 3 bays will be created in the fill area. The layout section 230 in FIG. 3B illustrates the preview display of 2 beams and the creation of 3 bays as a result thereof. FIG. 3C illustrates the changes to the GUI 110 when the user moves the mouse cursor to an edge of a different cell of the column grid 235. When the user does this, the entire preview graphics for the multiple beams moves into the different cell.

Figure 4A:
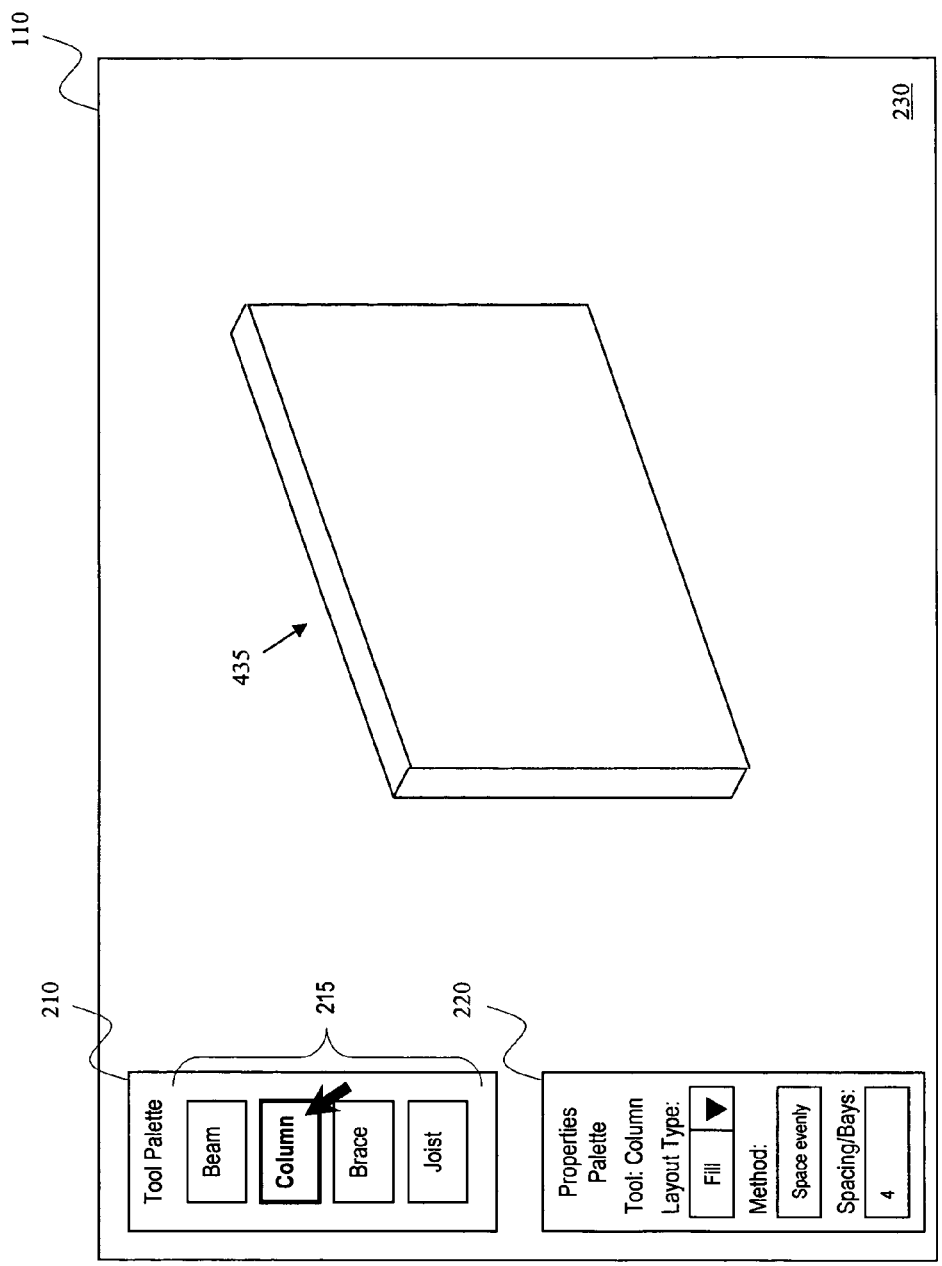
FIGS. 4A-4C are schematic representations of graphical user interfaces that illustrate a method according to still another embodiment of the present invention.
Figure 4B:
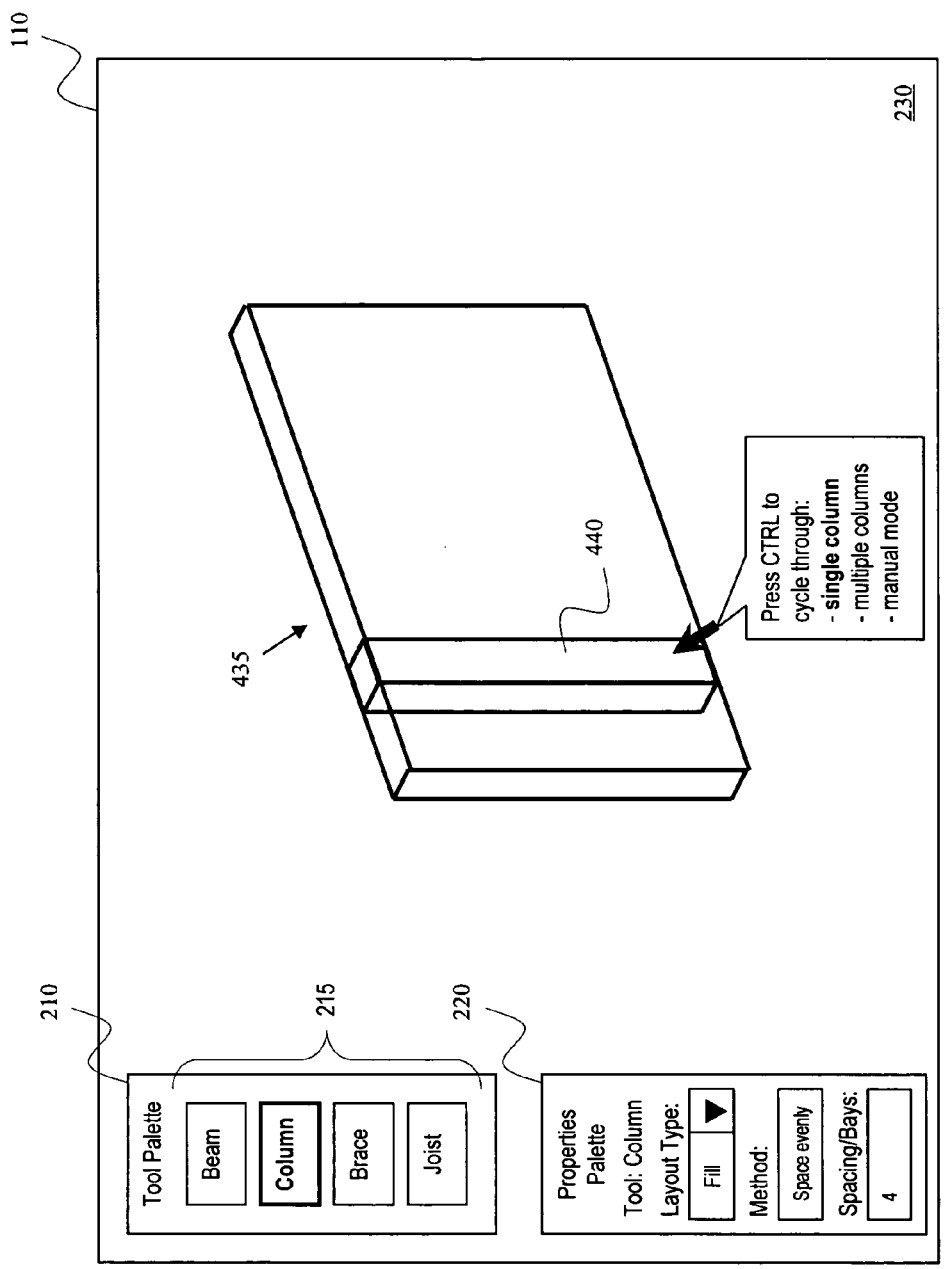
Figure 4C:
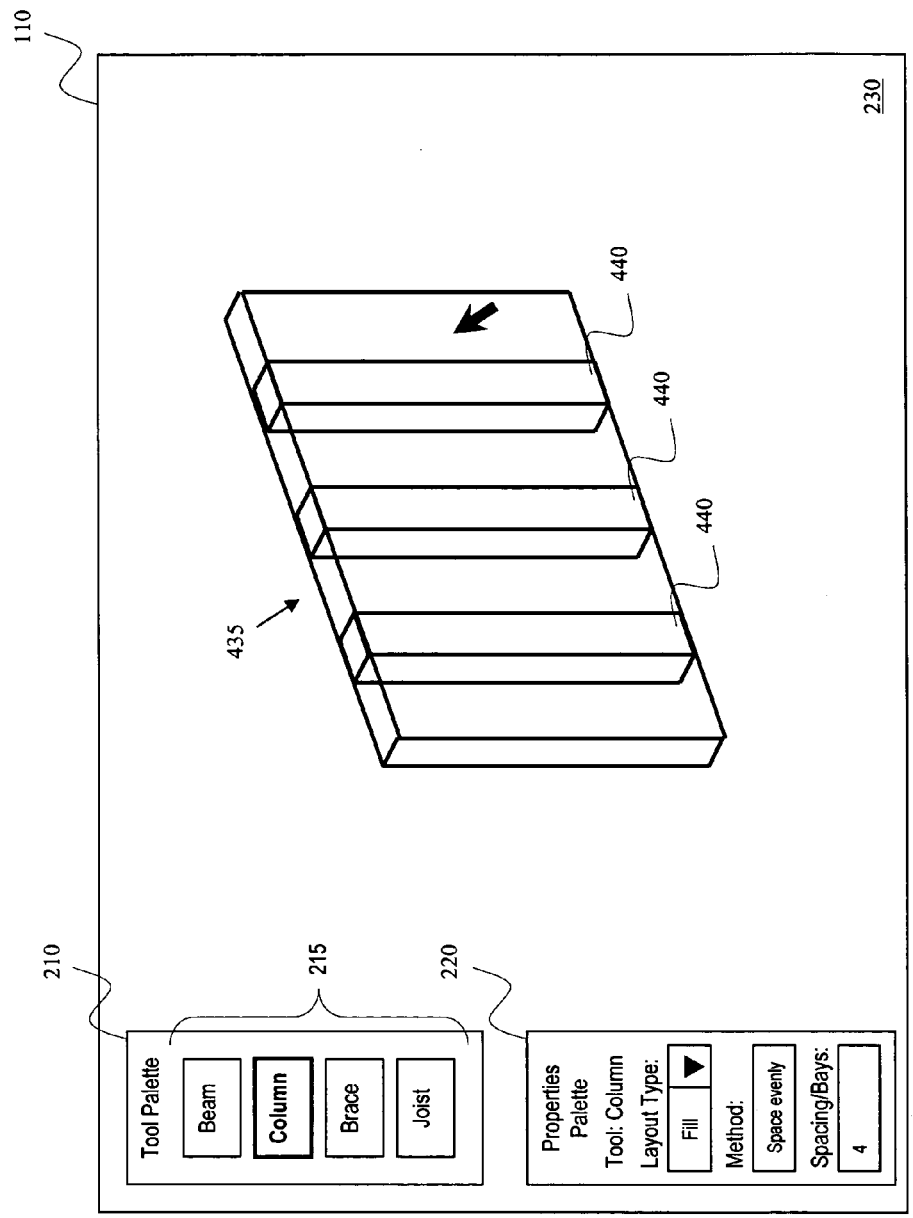

FIGS. 4A-4C are schematic representations of the GUI 110 that illustrate the changes in the GUI 110 as the user makes inputs through the GUI 110 to lay out multiple columns in a regular manner on a wall object 435. The layout section 230 can be viewed in either 2D or 3D and, in this example, it is viewed in 3D. FIG. 4A illustrates the selection of the "Column" drawing element from the tool palette 210 and the associated changes to the properties palette 220. When the user positions the mouse cursor on top of the wall object 435, the wall object 435 highlights and a preview display on one column 440 is generated on the wall object 435 at the location of the mouse cursor. This is shown in FIG. 4B. The user can lay out multiple columns 440 along the wall object 435 by either the "Repeat" layout method or the "Space evenly" layout method. The properties palette 220 in FIG. 4B shows that, in this example, the "Space evenly" layout method has been specified with the number of bays equal to 4. This means that 3 columns 440 will need to be generated in the fill area so that 4 bays will be created in the fill area. When the user presses the CTRL key once, the preview graphics for the multiple columns 440 are generated. This is shown in FIG. 4C.

In the examples provided above, when the user presses the mouse button after the preview graphics have been generated, the preview graphics are replaced with regular, more detailed, graphics, and the properties associated with the structural members that were calculated to generate the preview graphics and the regular graphics (e.g., length, orientation, and position of each of the structural members) are saved as part of the CAD drawing.

Figure 5:
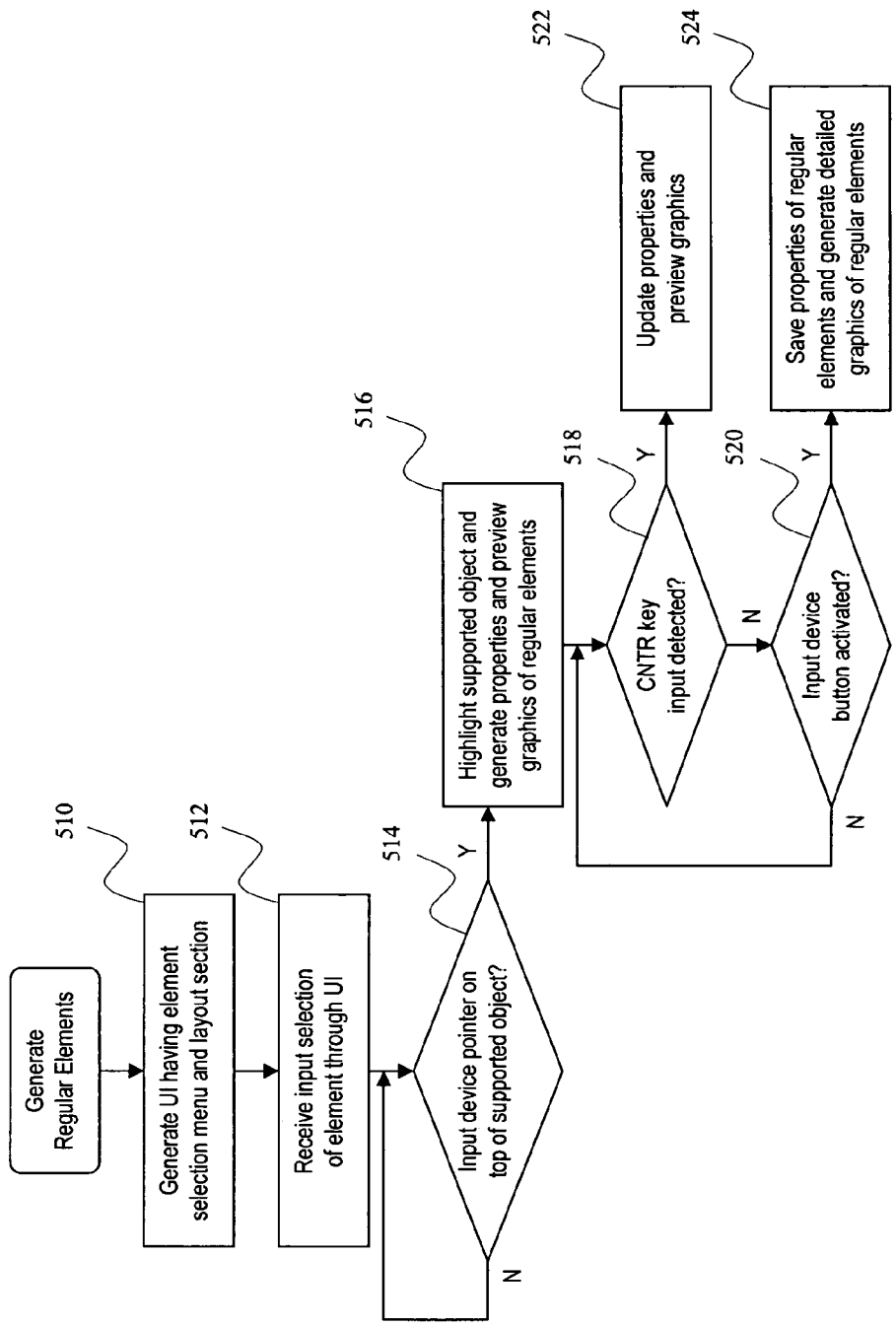
FIG. 5 is a flow diagram that illustrates the steps carried out by a computer system to generate regular elements for a CAD drawing in accordance with an embodiment of the present invention.
Figure 6:
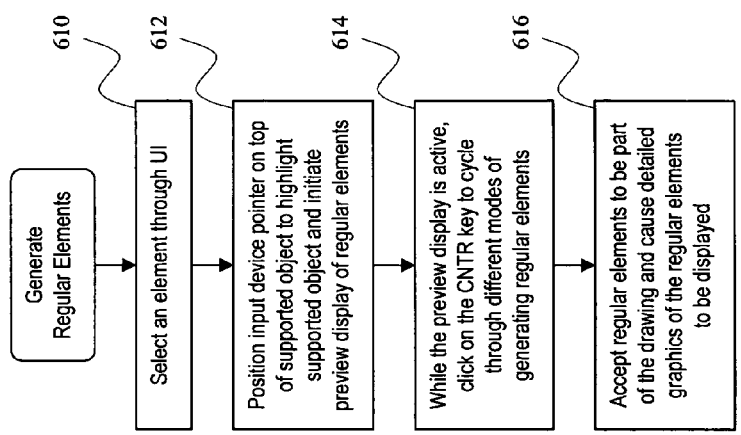
FIG. 6 is a flow diagram that illustrates the steps carried out by a user to generate regular elements for a CAD drawing in accordance with an embodiment of the present invention.

FIGS. 5 and 6 illustrate the steps that are carried out to generate regular elements for a CAD drawing in accordance with embodiments of the present invention. In FIG. 5, the computer system 100 is performing the steps. In FIG. 6, the user interacting with the GUI 110 is performing the steps.

In step 510, the GUI 110, like the one shown schematically in FIG. 2A, is generated and displayed to the user. This GUI 110 includes a drawing element selection menu (e.g., the tool palette 210) and a layout section (e.g., the layout section 230). Then, in step 512, the computer system 100 receives a selection of a particular tool from the user through the GUI 110. The computer system 100 then monitors the input device pointer (e.g., mouse cursor) to see if it is positioned on top of a supported object (e.g., column grid object 235) (step 514). If it is, flow proceeds to step 516, and the computer system 100 highlights the display of the supported object, creates instances of the drawing elements that are to be added to the CAD drawing, and generates the preview graphics for the drawing elements. In steps 518 and 520, the computer system 100 monitors the CTRL key and the input device button (e.g., mouse button) for activation. If the CTRL key is activated, the computer system 100 updates the properties and the preview graphics of the drawing elements to be added to the CAD drawing (step 522). If the input device button is activated, the properties of the drawing elements to be added to the CAD drawing are saved, and a display of the more detailed graphics of the drawing elements are generated (step 524).

In step 610, the user selects a particular drawing element from an element selection menu (e.g., the tool palette 210) that is displayed on a GUI 110 like the one shown schematically in FIG. 2A. Then, in step 612, the user positions an input device pointer (e.g., mouse cursor) on top of a supported object (e.g., column grid object 235) in response to which the supported object becomes highlighted on the GUI 110 and preview graphics of the drawing elements to be added to the CAD drawing are displayed. While the preview graphics are displayed, the user can cycle through different modes of generating drawing elements by pressing the CTRL key one or more times (step 614). In step 616, the user accepts the generated drawing elements to be part of the CAD drawing by pressing the input device button. This also causes the properties associated with the drawing elements to be saved and a display of the more detailed graphics of the drawing elements to be generated.

While the foregoing is directed to embodiments of the present invention, other and further embodiments of the invention may be devised without departing from the basic scope thereof, and the scope thereof is determined by the claims that follow. In one embodiment of the invention, a computer-readable medium comprises a computer program for instructing a computer system to carry out the steps of: displaying a user interface including an input section and a layout section; receiving a selection of a structural member through the input section; monitoring a position of an input device pointer on the user interface; and generating a display of a plurality of selected structural members within the layout section of the user interface when the input device pointer is positioned within the layout section.

What is claimed is:

1. A computerized method for automatically generating supporting structures for architectures using a graphical drawing computer program, comprising the steps of:
   displaying a graphical representation of a data object associated with an architecture that requires structural support by supporting structures;
   receiving a selection from a user of one of a plurality of supporting structure types;
   generating a layout for the architecture that comprises a plurality of the selected supporting structure type arranged in a formation that is based upon both a position of an input device of the user within the graphical representation of the data object and a plurality of configurable properties relating to the selected supporting structure type;
   automatically overlaying a graphical preview of the generated layout on the graphical representation of the data object, wherein the graphical preview indicates which of the configurable properties included in the plurality of configurable properties are selected, and wherein the graphical preview does not occlude the graphical representation of the data object;

receiving an update from the user indicating which properties included in the plurality of configurable properties are selected while the graphical representation of the data object and the graphical preview that is overlaid on the graphical representation of the data object are displayed; and updating the graphical representation of the data object and graphical preview that is overlaid on the graphical representation of the data object based upon both a position of the input device of the user within the graphical representation of the data object and the update received from the user.

2. The method of claim 1, further comprising the steps of:
generating a second layout for the architecture upon a change of position of the input device of the user; and
automatically displaying to the user a second graphical preview of the second layout as an overlay on the graphical representation of the data object.

3. The method of claim 1, further comprising the steps of:
generating a second layout for the architecture upon a change of one of the plurality of configurable properties; and
automatically displaying to the user a second graphical preview of the second layout as an overlay on the graphical representation of the data object.

4. The method of claim 1, further comprising the steps of:
receiving an acceptance of the graphical preview by the user; and
storing the layout in the data object in a memory.

5. The method of claim 1, wherein the architecture is a column grid or a wall.

6. The method of claim 1, wherein the plurality of supporting structure types includes beams, columns, braces and joists.

7. The method of claim 1, wherein the configurable properties relating to the selected supporting structure type include laying the supporting structure type along the edges of the architecture, repeating the supporting structure type in the architecture based upon a specified spacing, and repeating the supporting structure type in the architecture based upon a specified number of bays.

8. The method of claim 1, wherein the graphical representation is a three-dimensional graphical representation.

9. A computer readable medium including instructions for a graphical drawing computer program that, when executed by a processing unit of a computer system, causes the processing unit automatically generate supporting structures for architectures, by performing the steps of:
displaying a graphical representation of a data object associated with an architecture that requires structural support by supporting structures;
receiving a selection from a user of one of a plurality of supporting structure types;
generating a layout for the architecture that comprises a plurality of the selected supporting structure type arranged in a formation that is based upon both a position of an input device of the user within the graphical representation of the data object and a plurality of configurable properties relating to the selected supporting structure type;
automatically overlaying a graphical preview of the generated layout on the graphical representation of the data object, wherein the graphical preview indicates which of the configurable properties included in the plurality of configurable properties are selected, and wherein the graphical preview does not occlude the graphical representation of the data object;

receiving an update from the user indicating which properties included in the plurality of configurable properties are selected while the graphical representation of the data object and the graphical preview that is overlaid on the graphical representation of the data object are displayed; and updating the graphical representation of the data object and graphical preview that is overlaid on the graphical representation of the data object based upon both a position of the input device of the user within the graphical representation of the data object and the update received from the user.

10. The computer readable medium of claim 9, wherein the processing unit further performs the steps of:
generating a second layout that supports the architecture of the data object upon a change of position of the input device of the user; and
automatically displaying a second graphical preview of the second layout as an overlay on the graphical representation of the data object for acceptance by the user.

11. The computer readable medium of claim 9, wherein the processing unit further performs the steps of:
generating a second layout that supports the architecture of the data object upon a change of one of the plurality of configurable properties; and
automatically displaying a second graphical preview of the second layout as an overlay on the graphical representation of the data object for acceptance by the user.

12. The computer readable medium of claim 9, wherein the processing unit further performs the steps of:
receiving an acceptance of the graphical preview by the user; and
storing the layout in the data object.

13. The computer readable medium of claim 9, wherein the architecture is a column grid or a wall.

14. The computer readable medium of claim 9, wherein the plurality of supporting structure types includes beams, columns, braces and joists.

15. The computer readable medium of claim 9, wherein the configurable properties relating to the selected supporting structure type include laying the supporting structure type along the edges of the architecture, repeating the supporting structure type in the architecture based upon a specified spacing, and repeating the supporting structure type in the architecture based upon a specified number of bays.

16. The computer readable medium of claim 9, wherein the graphical representation is 3D.

17. A computer system adapted to execute a graphical drawing computer program to automatically generate supporting structures for architectures comprising:
a display device for displaying a graphical user interface of the computer graphics drawing program;
an input device enabling a user to interact with the graphical user interface; and
a processing unit configured to execute the graphical drawing computer program by performing the steps of:
displaying, in the graphical user interface, a graphical representation of a data object associated with an architecture that requires structural support by supporting structures,
receiving a selection from the user, through the input device, of one of a plurality of supporting structure types, generating a layout for the architecture that comprises a plurality of the selected supporting structure type arranged in a formation that is based upon a position of the input device of the user within the graphical representation of the data object and a plurality of configurable properties relating to the selected supporting structure type, automatically overlaying a graphical preview of the generated layout on the graphical representation of the data object, wherein the graphical preview indicates which of the configurable properties included in the plurality of configurable properties are selected, and wherein the graphical preview does not occlude the graphical representation of the data object, receiving an update from the user indicating which properties included in the plurality of configurable properties are selected while the graphical representation of the data object and the graphical preview that is overlaid on the graphical representation of the data object are displayed, and updating the graphical representation of the data object and graphical preview that is overlaid on the graphical representation of the data object based upon both a position of the input device of the user within the graphical representation of the data object and the update received from the user.

18. The computer system of claim 17, wherein the processing unit further performs the steps of:

generating a second layout that supports the architecture of the data object upon a change of position of the input device of the user; and automatically displaying a second graphical preview of the second layout as an overlay on the graphical representation of the data object for acceptance by the user.

19. The computer system of claim 17, wherein the processing unit further performs the steps of:

generating a second layout that supports the architecture of the data object upon a change of one of the plurality of configurable properties; and automatically displaying a second graphical preview of the second layout as an overlay on the graphical representation of the data object for acceptance by the user.

20. The computer system of claim 17, wherein the processing unit further performs the steps of:

receiving an acceptance of the graphical preview by the user; and storing the layout in the data object.

21. The computer system of claim 17, wherein the configurable properties relating to the selected supporting structure type include laying the supporting structure type along the edges of the architecture, repeating the supporting structure type in the architecture based upon a specified spacing, and repeating the supporting structure type in the architecture based upon a specified number of bays.

* * * * *